Sept. 14, 1965  R. D. WIERENGA ETAL  3,205,718
GIMBAL TORQUE COMPENSATION Filed May 31, 1962  2 Sheets-Sheet 1

INVENTORS
RODNEY D. WIERENGA
ROBERT C. FLINK
BY
Price & Heneveld
ATTORNEYS

United States Patent Office 3,205,718
Patented Sept. 14, 1965

3,205,718
GIMBAL TORQUE COMPENSATION
Rodney D. Wierenga and Robert C. Flink, Grand Rapids, Mich., assignors to Lear Siegler, Inc.
Filed May 31, 1962, Ser. No. 199,035
1 Claim. (Cl. 74—5.22)

This invention concerns a method and means for gimbal torque compensation, and more particularly a method of obtaining such compensation which does not add any spurious torques about the precession axis.

In the operation of a gyroscopically stabilized platform, there is a need for some method of limiting the angular motion or precession of the stabilizing gyrose caused by torques resulting, for example, from gimbal friction acting on the gyroscopically stabilized element of the platform. At the present time, several methods are being used to eliminate the effect of these torques. The principal one of these methods is the proportional type. This method uses an angular pickoff device which measures the angular error of the stabilizing gyro and puts out an electrical signal proportional to this angular error. This signal is then processed through relatively complex electronic equipment to produce an electrical output which is applied to a torque motor located on the stabilized gimbal axis. The torque motor then produces a compensating torque which opposes the precession-causing torque and brings the gyro back to its reference position. The disadvantages of this method include primarily its great cost and complexity, which increases its chances of failure and thus reduces its reliability. Other disadvantages include the necessity of designing the precession axis components in such a manner as to prevent magnetic interaction between relatively movable components.

It has been proposed to eliminate some of the disadvantages of the proportional method by continuously causing each gyro of the stabilized platform system to precess back and forth across its reference position through a substantial angle, i.e., about twelve degrees. This reciprocation method eliminates the effects of stiction and neutralizes the effects of Coulomb friction because the effects of the motion in each direction cancel each other out. The prior art solutions, however, had the distinct disadvantage of creating small switching torques about the precession axis, which could not be compensated and caused the other components of the stabilized platform system to drift.

It remained for the present invention to provide a reciprocating torque compensations system in which no net resultant torques are added about the precession axis. This is accomplished in the system of the present invention by optically sensing the precession of the gyro at the extremities of its range, and reversing the field direction of a continuously powered torque motor whenever the gyro reaches one of the limits of its precession range, which may in practice be made as large at ± 20°. When the system of this invention is used with a coasting gyro system such as that disclosed in the co-pending application Serial No. 208,660 filed on even date herewith, the range must be sufficiently wide to prevent resonant oscillation of the gyro system throughout its useful life, taking into consideration that as the coasting gyros slow down, their precession becomes more and more rapid and resonant oscillation becomes more and more likely if the precession range is insufficient.

On the other hand, the system of this invention is sufficiently flexible that in those applications where the precession angle must be kept to a minimum but oscillation is not a significant problem, the system can be made to reciprocate through an angle as small as ± 0.1 degree—a tolerance not possible with prior art devices.

It is therefore the object of this invention to provide means for subjecting gyroscopic elements to reciprocating precession without adding any torques about the precession axis.

It is a further object of this invention to provide photoelectric control means for such reciprocation.

It is another object of this invention to provide an extremely simple, reliable, accurate, and inexpensive reciprocating mechanism for the above-stated purposes.

These and other objects of this invention will become apparent from the following specification, taken in connection with the accompanying drawings in which.

Basically, the present invention is concerned with a method of subjecting a gyroscopic element to reciprocating precession about its reference position to neutralize stiction and Coulomb friction without introducing undesirable nutational drift and switching torques about the precession axis. The invention carries out this purpose by an electromechanical mechanism which has the further advantage of being extremely simple, reliable and inexpensive.

Figure 1:
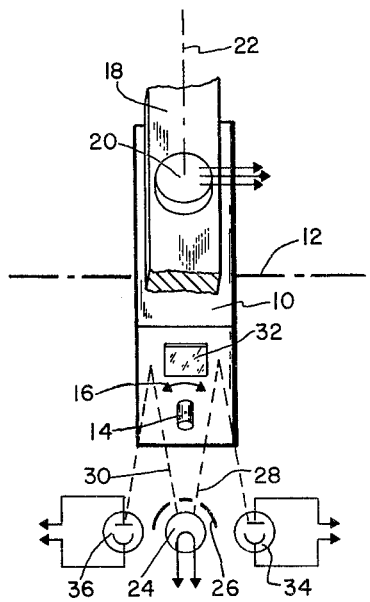
FIG. 1 is a schematic end elevational view showing the operation of the precession limit control of this invention.

In FIG. 1, a gyro 10 is shown in symbolical outline. The gyro 10 spins about the spin axis 12 and precesses about the precession axis trunnion 14 in the direction of the arrows 16. The stabilized platform is symbolically shown at 18. It is shown equipped with a torque motor 20 which produces a reversible torque about the stabilized axis 22. A light source 24, which may be equipped with a shroud 26 so arranged that the light source sends out a pair of sharply defined beams 28, 30 is fixedly mounted with respect to the stabilized platform 18 adjacent the gyro 10. A mirror 32 is mounted on the gyro 10 and turns with it about the precession axis trunnion 14. When the gyro 10 precesses to the right-hand limit of its range, the mirror 32 will be in a position to reflect beam 28 against phototube 34. When the gyro 10 reaches the left-hand limit of its precession range, the mirror 32 will be in position to reflect beam 30 onto phototube 36.

Figure 2:
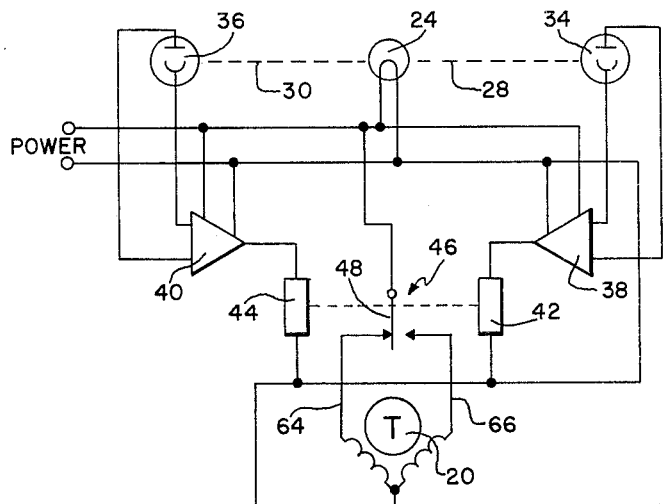
FIG. 2 is a circuit diagram of the reciprocating precession mechanism.

As is more clearly shown in FIG. 2, the phototubes 34, 36 are connected so that their signals are amplified by amplifiers 38, 40 and operate the coils 42, 44, respectively, of a bi-stable relay 46. The bi-stable relay 46 is so constructed that momentary energization of e.g. coil 42 will cause contact 48 to be drawn to its extreme right-hand position and to remain there until energization of coil 44 occurs, at which time contact 48 moves to its extreme left position and stays there until energization of coil 42. The torque motor 20 is so connected to the contacts of relay 46 that it is always energized in one direction or another, depending on the position of contact 48.

Operation

Figure 3:
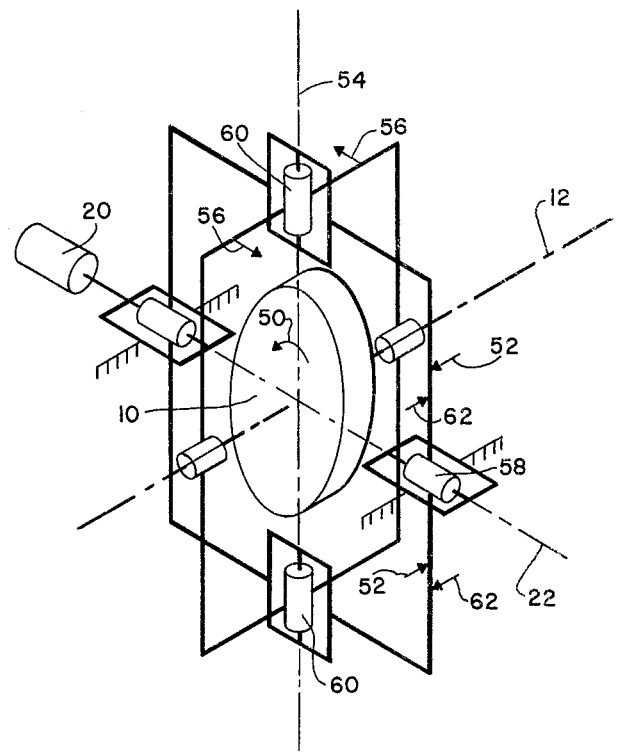
FIG. 3 is a schematic view illustrating the force relationships involved in the operation of the inventive device.

Referring to FIG. 3, the operation of the device of this invention will be explained in terms of a gyroscope 10 which spins about a spin axis 12 in the direction of the arrow 50. In accordance with well-known principles of physics, any torque acting about the stabilized axis 22 in the direction of the arrows 52 will cause the gyroscope 10 to precess about the precession axis 54 in the direction of the arrows 56. The stictional or frictional bearing torque of bearings 58 can be compensated by the torque motor 20, but the bearing torques of bearings 60 cannot. Consequently, the torques of bearings 60 are transmitted to the system in the form of drift. By continuously applying a torque first in the direction of the arrows 52 and then in the direction of the arrows 62, the gyro 10 is caused to precess back and forth about the precession axis 54 through a limited arc on either side of the reference position shown in FIG. 3. This continuous reciprocating precession eliminates stiction torques in bearings 60 and cancels out the torques resulting from Coulomb friction because the gyroscope reciprocates through the same arc in both directions, leaving only the time-average effect of the torques acting around axis 54 from other causes.

The operation of the circuit of FIG. 2 is as follows: When the gyroscopic system is initially powered, the contact 48 of relay 46 is in one of its two stable positions, say, the position shown in FIG. 2. In this condition, the torque motor 20 is powered through wire 64 and exerts, for example, a torque in the direction of arrows 52 (FIG. 3). The gyro 10 now precesses about the precession axis 54 in the direction of arrows 56 until it reaches a position in which light beam 28 hits photocell 34. The resultant signal from photocell 34 is amplified by amplifier 38 and energizes coil 42 of relay 46. This causes contact 48 to move over to its other stable position, and torque motor 20 is then energized through wire 66. The torque motor 20 now imposes a torque about axis 22 in the direction of arrows 62, and the gyro 10 precesses back in the opposite direction until it reaches the other limit of its range, at which beam 30 impinges on phototube 36 and returns contact 48 to its original position by energizing coil 44 through amplifier 40.

It will be seen that the present invention provides a simple, inexpensive, and reliable mechanism for gimbal torque compensation. Obviously, the teachings of the invention can be carried out in many different ways, and we therefore do not desire to be limited by the illustrative embodiment shown, but only by the scope of the following claim.

We claim:

In an inertial guidance system comprising a stabilized platform and gyroscopic means for stabilizing said platform: means for subjecting said stabilized platform to a predetermined torque so as to cause said gyroscopic means to precess through a substantial arc; and direction reversing means actuated when said gyroscopic means reach the end of said arc for reversing the direction of said predetermined torque so as to cause said gyroscopic means to precess in the opposite direction, whereby said gyroscopic means are caused to precess back and forth through a substantial predetermined range; the improvement comprising said direction reversing means including a pair of spaced photoelectric devices, optical reflection means on said gyroscopic means, and a source of illumination, said illumination source, reflection means and photoelectric devices being so disposed with respect to one another that light from said illumination source is reflected on one of said photoelectric devices when said gyroscopic means reaches one limit of its precession range, and onto the other photoelectric device at the other limit of the precession range; and relay switching means electrically connected to said direction reversing means and controlled by said photoelectric devices.

References Cited by the Examiner

UNITED STATES PATENTS

| | | | |
|---|---|---|---|
| 1,639,233 | 8/27 | Paxton | 74—5.37 |
| 1,999,646 | 4/35 | Wittkuhns | 74—5.6 |
| 2,517,786 | 8/50 | Hammond | 74—5.47 |
| 2,907,213 | 10/59 | Wendt | 74—5.47 |

BROUGHTON G. DURHAM, *Primary Examiner.*